United States Patent
Roenspies et al.

(10) Patent No.: US 9,487,223 B1
(45) Date of Patent: Nov. 8, 2016

(54) AUTOMATIC TRAIN OPERATION TENDER UNIT

(71) Applicant: Electro-Motive Diesel, Inc., LaGrange, IL (US)

(72) Inventors: David Matthew Roenspies, Elburn, IL (US); James David Seaton, Westmont, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 3 days.

(21) Appl. No.: 14/704,681

(22) Filed: May 5, 2015

(51) Int. Cl.
  *B61L 27/04* (2006.01)
  *B61L 27/00* (2006.01)

(52) U.S. Cl.
  CPC ............ *B61L 27/04* (2013.01); *B61L 27/0005* (2013.01); *B61L 27/0061* (2013.01); *B61L 2201/00* (2013.01)

(58) Field of Classification Search
  CPC .............. B61L 27/04; B61L 27/0005; B61L 27/0061; B61L 2201/00
  USPC ......................................................... 701/31.4
  See application file for complete search history.

(56) References Cited

U.S. PATENT DOCUMENTS

| | | | |
|---|---|---|---|
| 6,135,396 A * | 10/2000 | Whitfield ............... | B61L 3/125 246/167 R |
| 8,346,414 B2 | 1/2013 | Liberatore | |
| 8,880,248 B2 | 11/2014 | Frazier et al. | |
| 8,935,022 B2 * | 1/2015 | Cooper ........................ | 180/14.1 |
| 2012/0303237 A1 | 11/2012 | Kumar et al. | |
| 2014/0114507 A1 * | 4/2014 | Kernwein ............... | B61L 3/008 701/19 |
| 2014/0263860 A1 * | 9/2014 | Iden ........................ | B61C 17/12 246/187 A |
| 2014/0358336 A1 * | 12/2014 | Otsubo ................... | B61C 17/12 701/19 |
| 2016/0176425 A1 * | 6/2016 | Traylor ................... | B61L 27/04 701/19 |

* cited by examiner

*Primary Examiner* — Brian P Sweeney
(74) *Attorney, Agent, or Firm* — Miller, Matthias & Hull LLP

(57) ABSTRACT

An automatic train operation system is presented for use with a train to automatically operate the train. The automatic train operation system is housed on a tender car and connected to a second rail vehicle. The automatic train operation system is connected to the second rail vehicle through end connections. Additionally, the automatic train operation system communicates with the second rail vehicle through the end connections. The end connections are operable to transmit an operation signal between the automatic train operation system and the second rail vehicle. The second rail vehicle completes the operation signal base on an executable command contained within the operation signal and sent from the automatic train operation system.

20 Claims, 9 Drawing Sheets

AUTOMATIC TRAIN OPERATION TENDER UNIT

TECHNICAL FIELD

The present disclosure generally relates to the automatic operation of locomotives, and more particularly relates to a tender unit which can connect with a locomotive for automatic operation of the locomotive.

BACKGROUND

Traditional operation of a locomotive starts with a train engineer or a conductor. Sitting in a cab section of a locomotive, the engineer runs the operation of the train. The engineer will manually input commands into the control unit of the locomotive so that the train may speed up, slow down, or brake. Although this set up works well for short trips, longer trips can be exhausting and tedious for a human conductor to be ever vigilant, or to perform tasks adjusting the locomotive systems over a long period of time.

Moreover, while a single locomotive arrangement may work well for short trips, in longer trips or when pulling a heavy transport load, multiple locomotives are needed. When multiple locomotives are connected together they form a consist. Consist configurations are typical for long range freight travel in the transport industry. Usually when a train is put together, one or more consists are connected to pull the remaining railcars. These locomotives can be located together either in the front of the train or split up between the front, middle, and rear portions of the train. In a consist formation one of the multiple locomotives is assigned as a first locomotive. The first locomotive is the one locomotive which is in charge of communicating with the other locomotives of the consist to issue controlling commands such as speeding up, slowing down, or braking depending on the desired effect.

In the freight industry, there are multiple manufacturers of locomotives. The American Association of Railroads (AAR) provides interface standards so that all modern manufactured locomotives can be intermixed and interconnected. These existing interface connections allow for inter-locomotive communications. The existing connections do not however allow for an independent control vehicle to have substantial and detailed control of the first locomotive of the consist. Therefore, it would be advantageous to produce such an independent control vehicle which may wield this level of control and autonomy.

Previous efforts have been made to produce an automatic train operation system, but have not completely addressed the issue of ultimate autonomy for the entire train. One example is United States Patent Application No. US2014/0263860A1 which discloses a system with the goal to control a remote non-distributed power locomotive that is behind a lead distributed power locomotive. However, disclosures such as this have not addressed the issue of producing an independent control vehicle that can interface through existing connections with a first locomotive of a consist to effectively operate the first locomotive from the independent control vehicle. Additionally, efforts such as this have not addressed the issue of controlling a first locomotive as well as remote locomotives through the interconnected independent control vehicle.

As stated earlier, these consists travel great distances hauling their respective payloads. Therefore it would be advantageous to produce a type of automatic operation system which can properly communicate with the different locomotives produced from different manufacturers. An operation system such as this could allow an independent control vehicle to have substantial and detailed control of a first locomotive of the consist. Additionally, this independent control vehicle could allow for distribute power on a train whose first locomotive does not have distributed power equipped. Furthermore, it would be advantageous to produce an automatic operation system that allows for an automated journey of the train thereby lessening the need for additional personnel to ride along with the train as it travels.

SUMMARY OF THE DISCLOSURE

In one aspect of the disclosure, a tender unit for automatic operation of a train is disclosed which may have a railcar base and a containment unit to house an automatic train operation system placed on top of the railcar base. An end connection may lead out of the containment unit housing the automatic train operation system and connect the automatic train operation system to a second rail vehicle. The end connection may be operable to transmit an operation signal between the automatic train operation system and a second rail vehicle connected to the end connection. The operation signal may then be completed by the second rail vehicle based on an executable command contained within the operation signal.

In another aspect of the disclosure, a train which can be automatically controlled by an attached tender unit is disclosed. The train may have a plurality of rail vehicles positioned along a track and attached to one another. A first locomotive may be one of the plurality of rail vehicles. A tender unit, being another of the plurality of rail vehicles, is placed adjacent to the first locomotive. The tender unit may have a railcar base attached to the first locomotive by a coupling connection. A containment unit to house an automatic train operation system may be placed on top of the railcar base of the tender unit. An end communication connection may connect the automatic train operation system to the first locomotive. The end communication connection may be operable to transmit an operation signal between the automatic train operation system and the first locomotive connected to the end communication connection. The operation signal may then be completed by the first locomotive based on an executable command contained within the operation signal.

In yet another aspect of the disclosure, a method to automatically operate a train is disclosed. First, a train is assembled to have a first locomotive. A tender unit capable of automatic train operation is then attached to the first locomotive. The tender unit is configured as the control lead of the train. The tender unit may have a railcar base and a containment unit to house an automatic train operation system placed on top of the railcar base. An end connection of the tender unit leads out of the containment unit housing the automatic train operation system and connects to the automatic train operation system. The end connection connects the automatic train operation system to the first locomotive. Furthermore, the end connection is operable to transmit an operation signal between the automatic train operation system and the first locomotive connected to the end connection. Next, the operation signal is sent from a remote location. The operation signal from the remote location is received by a communication module of the automatic train operation system. The operation signal is then processed within the automatic train operation system. After processing the operation signal an executable command is created within the automatic train operation system.

The executable command is sent to the first locomotive from the automatic train operation system by way of the end connection. The first locomotive receives the executable command, and then the first locomotive performs the executable command based on the operation signal received by the automatic train operation system.

These and other aspects and features of the present disclosure will be more readily understood when reading the following detailed description taken in conjunction with the accompanied drawings.

It should be understood that the drawings are not necessarily to scale and that the disclosed embodiments are illustrated diagrammatically and in partial views. It should be further understood that this disclosure is not to be limited to the particular embodiments illustrated herein.

DETAILED DESCRIPTION

An automatic train operation (ATO) tender unit allows for the operation of a locomotive or train from a remote location. Furthermore, operation of an ATO tender unit can streamline automatic operation of the train through the use of the ATO tender unit so that less conductor or engineer involvement is needed. An ATO tender unit such as this can attach to multiple different locomotives to function even though they may be manufactured by different companies and may use different command protocols for operation. The following embodiments of the present disclosure seek to provide an automatic train operation tender unit which can communicate and operate with different locomotives to streamline freight travel.

Figure 1:
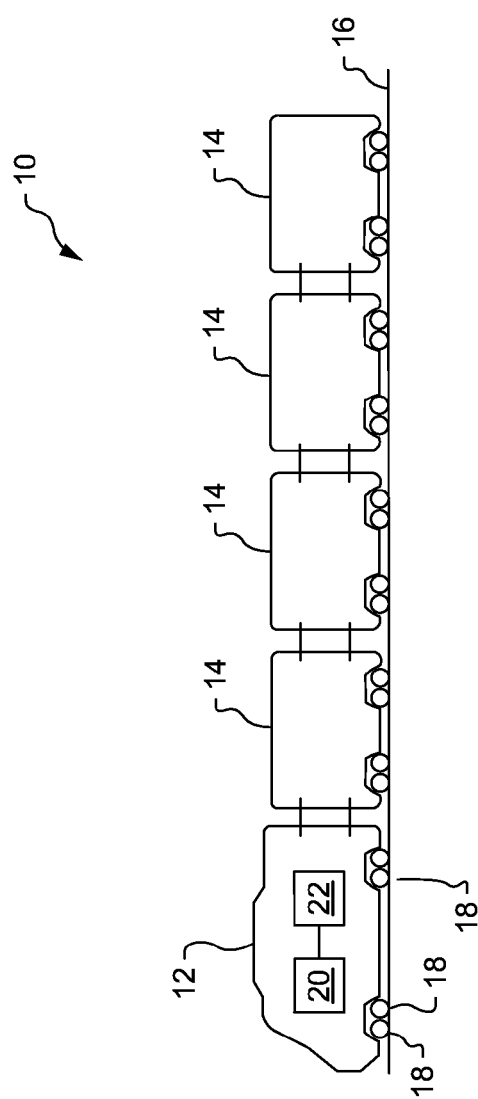
FIG. 1 is a diagrammatic view of a vehicle, in accordance with one embodiment of the present disclosure.

Referring now to the drawings, and with specific reference to FIG. 1, a vehicle consistent with an embodiment of the present disclosure is generally referred to by reference numeral 10. Although vehicle 10 is illustrated as a rail transport vehicle, the vehicle 10 may be any type of vehicle or machine used to perform a driven operation involving physical movement associated with a particular industry, such as, without limitation, transportation, mining, construction, landscaping, forestry, agriculture, etc.

Non-limiting examples of such vehicles and machines, for both commercial and industrial purposes, include but are not limited to trains, diesel-electric locomotives, diesel mechanical locomotives, mining vehicles, on-highway vehicles, earth-moving vehicles, loaders, excavators, dozers, motor graders, tractors, trucks, backhoes, agricultural equipment, material handling equipment and other types of vehicles that may operate in a tracked work environment. It is to be understood that the vehicle 10 is shown primarily for illustrative purposes to assist in disclosing features of various embodiments, and that FIG. 1 does not depict all of the components of a vehicle 10.

The vehicle 10 may include a locomotive 12 coupled to at least one railcar 14. The vehicle 10 may travel along a route 16, such as, one or more rails of a track. Railcars 14 may be passenger cars or freight cars for carrying passengers, goods, or other loads. The locomotive 12 and railcars 14 may travel along the route 16 with the use of wheels 18. The locomotive 12 may include an engine 20, or other power source, and a power system 22. The engine 20 may be electric, diesel, steam, hydrogen, gas turbine powered, hybrid, or of any other type for generating energy to propel the vehicle 10. Power system 22 may be configured to distribute electrical power to propulsion and non-propulsion electric loads.

Figure 2:
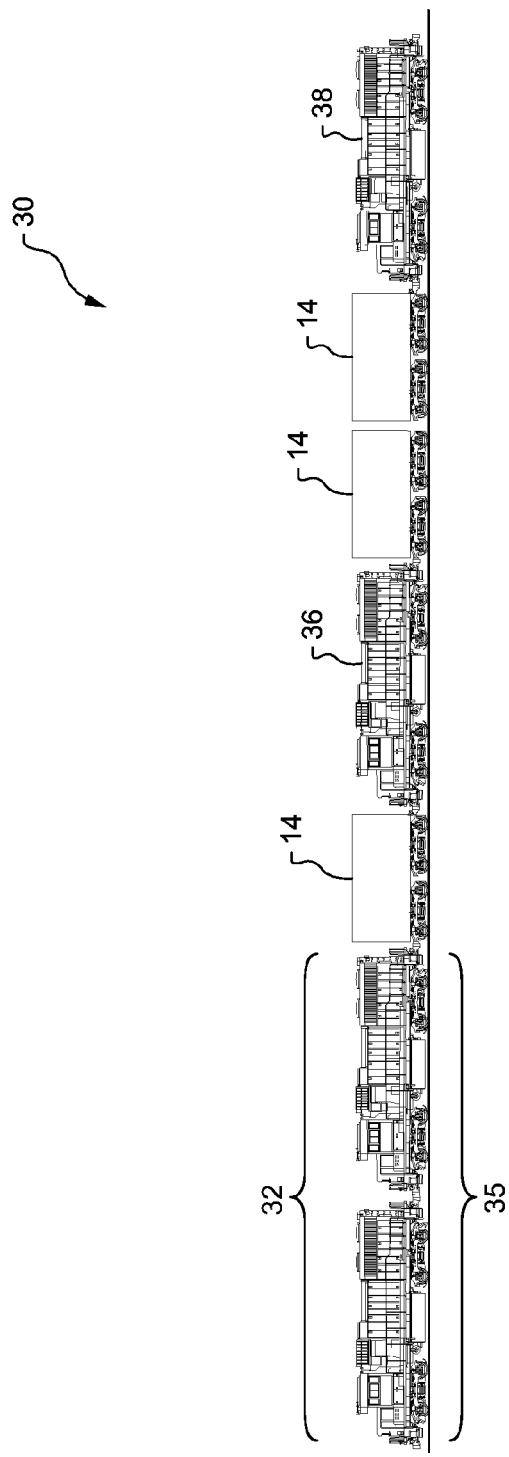
FIG. 2 is a diagrammatic view of a train, in accordance with one embodiment of the present disclosure.

FIG. 2 illustrates a typical train 30 configuration. In a configuration such as this multiple locomotives 32 are connected together at the front of the train 30. Multiple locomotives 32 connected together and in communication with one another to pull a train are called consist 35. Additional locomotives such as a middle locomotive 36 and a rear locomotive 38 can be attached to the train 30 as well. Placed in between the locomotives 32, 36, and 38 of the train 30 are the railcars 14. The railcars 14 as stated above can be passenger cars or freight cars for carrying passengers, goods, or other loads.

Figure 3:
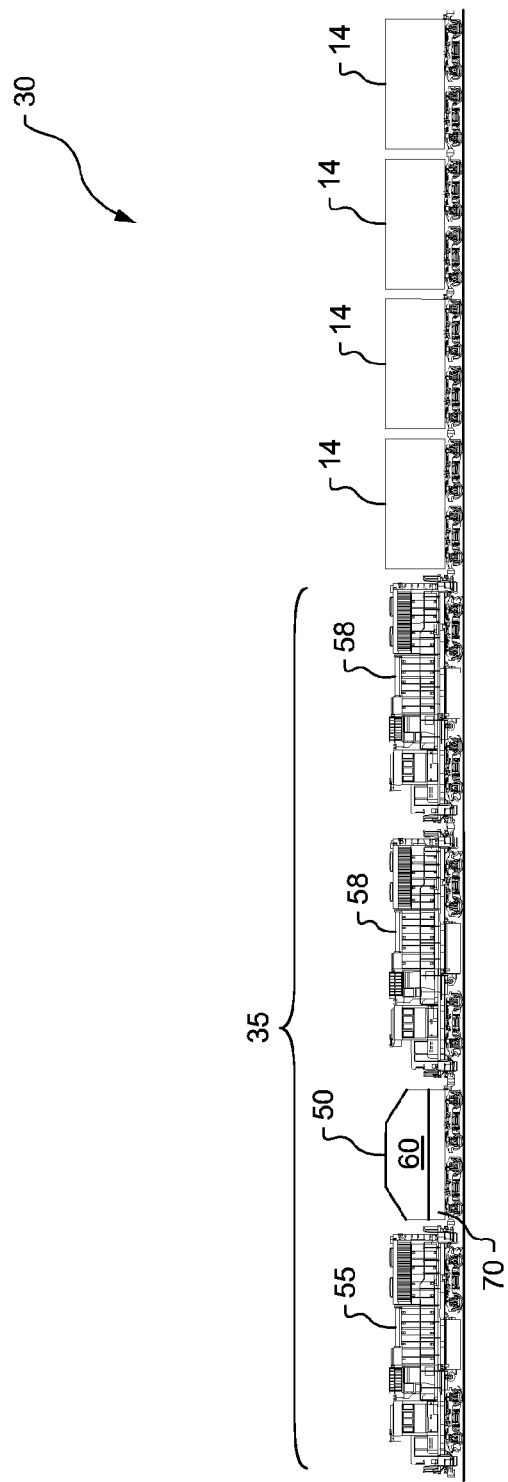
FIG. 3 is a diagrammatic view of a train with an automatic train operation tender unit attached in accordance with one embodiment of the present disclosure.

FIG. 3, as illustrated, shows a train 30 configuration including an automatic train operation (ATO) tender unit 50. The ATO tender unit 50 is placed behind the first locomotive 55 of the train 30, although the ATO tender unit 50 may be placed in a different position along the train 30 as long as it is in communication with the first locomotive 55 of the consist 35. Additional locomotives 58 may then be placed behind the ATO tender unit 50. The combination of the first locomotive 55, the ATO tender unit 50, and the remaining locomotives form the consist 35 in this embodiment of the present disclosure. The remainder of the railcars 14 including additional locomotives 58 are subsequently placed behind the ATO tender unit 50. The ATO system 60 may be housed on top of a rolling stock tender car 70 to form the ATO tender unit 50. The ATO tender unit 50 is connected to the locomotives 55 and 58 of the train 30 through the normal train connection mechanisms used to interlock railcars 14 and locomotives 55 and 58 to one another. Additionally, the ATO tender unit 50 is connected to the locomotives 55 and 58 of the train 30 to send and receive signals between the multiple locomotives 55 and 58 of the consist 35. Detailed information regarding these connections will be discussed further below.

Figure 4:
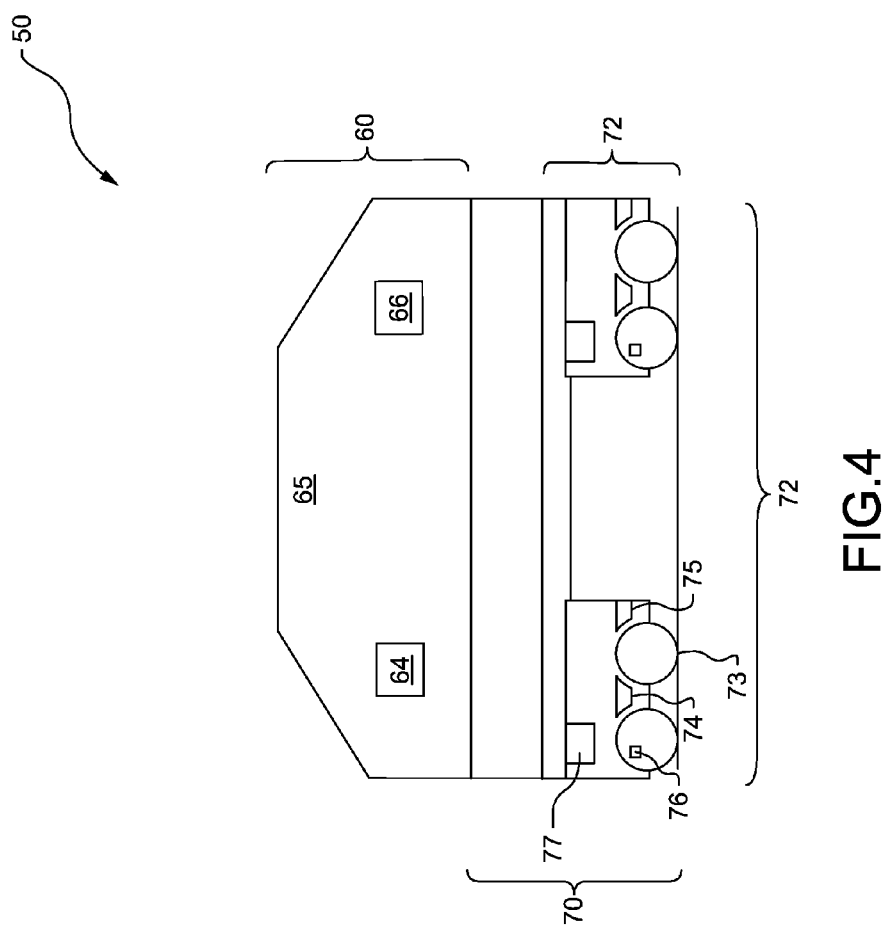
FIG. 4 is a side view of the automatic train operation tender unit in accordance with one embodiment of the present disclosure.

A side view of the ATO tender unit 50 is provided in FIG. 4. From this side view one can see the ATO system 60 being housed within a containment unit 65 on top of the rolling stock tender car 70. The base of the rolling stock tender car 70 is a typical rail car base. The base of the rolling stock tender car 70 may include a four axle bogie 72. As used herein, the four axle bogie 72 is a chassis substructure including wheels 73, brakes 74 and a parking brake 75. Additionally, a wheel sensor 76 may be attached to the four axle bogie 72. The wheel sensor 76 measures the revolutions per minute of the wheels 73 during operation of the rolling stock tender car 70. The wheel sensor 76 is in communication with and connected to the ATO system 60 housed within the containment unit 65. Additionally, a traction motor generator 77 may be attached to the four axle bogie 72 of the rolling stock tender car 70. The traction motor generator 77 is used for powering the ATO tender unit 50. The traction motor generator 77 may pull power from the movement of the wheels 73 during operation of the train to generate power for use by the ATO system 60. Additionally, the ATO system 60 is in communication with the brakes 74 and the parking brake 75 of the four axle bogie 72. The ATO system 60 can issue commands to the brakes 74 and the parking brake 75 to engage and disengage when needed for operation.

Although a typical railcar base like the four axle bogie 72 is used in this embodiment of the present disclosure, alternate railcar bases may be used. In an alternate embodiment of the present disclosure, the ATO system 60 housed within the containment unit 65 may be place on top of a high rail base. A high rail base configuration may consist of a four axle set up. In the ground movement system, two ground movement axles each connect to the chassis of the high rail base. A ground movement wheel is attached on each end of both of the two ground movement axles. The ground movement wheels may be made of a rubber material or the like so that the ATO tender unit 50 can move freely while not placed on a route 16 or track. Through connections between the chassis of the high rail base and at least one of the two ground movement axles, the ground movement wheels may be able to turn and rotate so that the ATO tender unit 50 can execute turns when operating on the ground. Additionally, the high rail base may have a rail movement system. In the rail movement system, two rail axles each having a rail wheel placed on each end of the axle may also be attached to the chassis of the high rail base. In a configuration such as this, the ATO tender unit 50 may be able to move not only on the rails of a track, but also on the ground depending on the preferred route 16. Power and braking systems for movement and braking for both the ground movement system and the rail movement system would attach to the ATO system 60 for connected power and operational drive and braking commands. In an operational setting, the high rail base of the ATO tender unit 50 may be aligned over a track or route 16. Power from the ATO system 60 would move the rail axles from a disengaged position close to the chassis to an engaged position in which the rail wheels are in contact with the track. In this engaged position, the ground movement wheels are lifted off the surface of the ground and suspended in the air as the rail wheels are in contact with the track. This allows for the ATO tender unit 50 to travel along the route 16 of the track without the ground movement wheels coming into contact with the ground. If the ATO tender unit 50 ends its journey and needs to be placed behind another locomotive for a different journey, the ATO tender unit 50 having the high rail base would disengage the rail axles thereby pulling the rail axles up to the chassis of the high rail base. By placing the rail axles in this disengaged position, the ground movement wheels of the ground movement axles are now in contact with the ground surface. Operational commands from the ATO system 60 can then drive the ATO tender unit 50 traveling with the ground movement wheels in contact with the ground to a new position. Driving the ATO tender unit 50 in this fashion, allows for the ATO tender unit 50 to easily move between one train and the next within a congested rail yard setting so that the ATO tender unit 50 can be easily attached to a new locomotive of the train it is scheduled to operate.

Turning back to FIG. 4, a set of interface panels 64 and 66 may be provided on the side of the containment unit 65 housing the ATO system 60. The interface panels 64 and 66 allow a user to interact with the internal systems of the ATO system 60. At least two distinct systems can be accessed by a user inputting commands into the interface panels 64 and 66. These two systems may have separate interface panels 64 and 66 accessible on a side wall of the containment unit 65, or they may share one common interface panel 64. A first interface panel 64 may access the signaling system 80 of the ATO system 60. The details of the signaling system 80 will be discussed in greater depth below, but at this first interface panel 64 a user can access the ATO system 60 to set up, view, or edit the signaling information provided by the signaling supplier regarding previous or future journeys of the ATO tender unit 50. Additionally, a second interface panel 66 may be accessible to a user on the side wall of the containment unit 65. This second interface panel 66 connects to and allows the user to access the automatic train operation (ATO) tender unit control system 90 of the ATO system 60. From this second interface panel 66 a user can access, change, report, or retrieve virtual control system information relating to previous or upcoming journeys of the ATO tender unit 50. The details of the ATO tender unit control system 90, like that of the signaling system 80, will be discussed in more depth in the following paragraphs.

Figure 5:
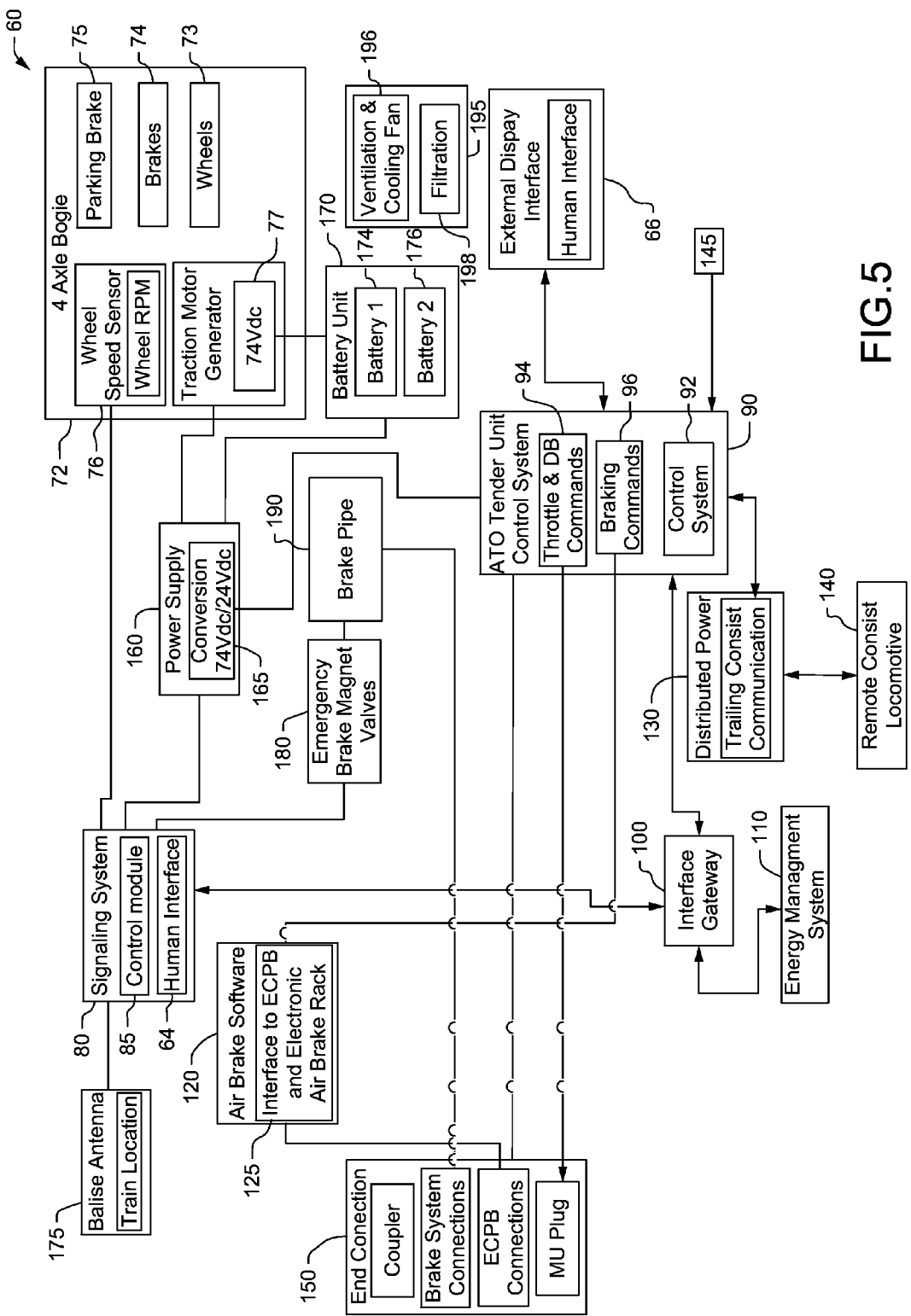
FIG. 5 is a schematic view of the multiple systems of the automatic train operation system including the interconnections between the multiple systems in accordance with one embodiment of the present disclosure.

FIG. 5, as illustrated, shows an interconnected layout of the systems contained on the ATO tender unit 50. An interface gateway 100 may connect the major systems of the ATO system 60. The major systems of the ATO system 60 may include the signaling system 80, the ATO tender unit control system 90, and an energy management system 110. All three of these systems may be connected to the interface gateway 100 by way of a two-way Ethernet communication connection or the like. One of these systems, the energy management system 110, stores data information on memory components and runs diagnostics on processors to make sure that the ATO system 60 is running efficiently and smoothly. Information calculated, received or computed from the energy management system 110 can then be communicated to the other major systems of the ATO system 60 through the Ethernet connection of the like. Additionally, the information obtained from the energy management system 110 can be communicated to a remote offsite location from that of the ATO tender unit 50 through other communication modules provided by the other systems of the ATO system 60.

The ATO tender unit control system 90 is another major system of the ATO system 60. The ATO tender unit control system 90 has memory components for storage, and processors for data computation and calculation. The ATO tender unit control system 90 may contain the overall control system 92 for the ATO tender unit 50. The overall control system 92 runs stored algorithms and processes information from the multiple systems connected to the ATO tender unit control system 90 so that the ATO tender unit 50 operates correctly. The overall control system 92 of the ATO tender unit control system 90 can also receive information from offsite locations to be analyzed and computed by the ATO tender unit control system's memory and processors. Evaluating and running this received offsite information enables the ATO tender unit control system 90 to operate without manual input of a user located by the ATO tender unit 50. Also contained within the ATO tender unit control system 90 are throttle and database commands 94. Using driving strategy algorithms, the energy management system 110 calculates the speed and power needed to move the train 30 connected to the ATO tender unit 50. The energy management system 110 then relays those throttle and database commands 94 to the ATO tender unit control system 90, which then sends commands to operate the first locomotive 55 through the end connections 150, or through the distributed power system 130 for the remote consist locomotive 140.

Braking commands 96 may also be contained within the ATO tender unit control system 90. If the train 30 needs to brake, slow down, or stop, the ATO tender unit control system 90 sends braking commands 96 to the air brake software 120 of the ATO system 60. To do so, the ATO tender unit control system 90 may be connected to the air brake software 120 by a one-way serial connection or the like. The air brake software 120 can then communicate the braking commands 96 to the connected first locomotive 55 through end connections 150 of the ATO system 60. Additionally, the air brake software 120 interfaces with the electric air brake rack 125 of the ATO tender unit 50.

As stated above the ATO tender unit control system 90 connects to the second interface panel 66 that is outside the containment unit 65 of the ATO system 60. The second interface panel 66 may be connected to the ATO tender unit control system 90 by a two-way Ethernet connection or the like. The second interface panel 66, positioned on the outside of the containment unit 65 of the ATO system 60, allows a user to access the ATO tender unit control system 90 directly while standing near the ATO tender unit 50. A user accessing the ATO tender unit control system 90 in this way is then allowed access to all the commands and information available just as a user would who would be accessing to the ATO tender unit control system 90 remotely.

Additionally, the ATO tender unit control system 90 connects to a distributed power system 130. The distributed power system 130 is connected to the ATO tender unit control system 90 by a two-way serial connection or the like. The distributed power system 130 in an embodiment of the present disclosure may be tasked with communicating with a remote consist locomotive 140 that is not the first locomotive 55. The distributed power system 130 can send operation signals, executable commands, and power information to the remote consist locomotive 140 so that the remote consist locomotive 140 can adjust driving functions based on the information issued by the ATO tender unit control system 90. To communicate with the remote consist locomotive 140, the distributed power system 130 communicates wirelessly with the remote consist locomotive 140.

In an operational setting, the ATO tender unit control system 90 may receive an operation signal 145. The operation signal 145 may be inputted manually by a user using the second interface panel 66 or the operation signal 145 may be received wirelessly from a remote back office. After receiving the operation signal 145, the ATO tender unit control system 90 can compute that operation signal 145 to produce an executable command 148. That executable command 148 may be a throttle and database command 94 or a braking command 96 or the like. The ATO tender unit control system 90 may then send the executable command 148 along with the operation signal 145 to designated locomotive which may be the first locomotive 55 or the remote consist locomotive 140 or the like.

Additionally, for the ATO tender unit control system 90 to operate, a power supply 160 is needed. Therefore, a power supply 160 may be supplied within the containment unit 65 for the ATO system 60. The power supply 160 provides electrical power, such as direct current power, to the multiple systems of the ATO tender unit 50. Additionally, the power supply 160 has the capability to convert voltage 165 to a lower dropdown level or a higher voltage level. Since the systems and units interconnected within the ATO system 60 operate on potentially different voltages, such as but not limited to 74 volts or 24 volts, the power supply 160 can convert the voltage output of the power supply 160 to match the correct voltage output needed by the connected systems or units. One voltage output of the power supply 160 is then connected to the ATO tender unit control system 90 to provide power, such as but not limited to 24 volts, to the ATO tender unit control system 90. The power supply 160 may also be connected to the traction motor generator 77 of the four axle bogie 72 to provide power, such as but not limited to 74 volts, to the ATO tender unit control system 90. Another important system of the ATO tender unit 50, the signaling system 80, is also connected to the power supply 160. The power supply 160 provides power, such as but not limited to 24 volts, to the signaling system 80 of the ATO system 60 though this connection.

If the ATO tender unit 50 is not connected to a consist 35 or first locomotive 55, the ATO tender unit 50 still needs power to operate. Therefore, a battery unit 170 may be present within the containment unit 65 of the ATO system 60. The battery unit 170 provides at least one battery 174, and may be a plurality of batteries 174 and 176, to power the ATO tender unit 50 when it is not connected to a first locomotive 55 or a consist 35. The battery unit 170 connects directly to the power supply 160 so that the batteries 174 and 176 may power the multiple systems attached to the power supply 160. The connection between the power supply 160 and the battery unit 170 maybe, but is not limited to, a 74 volt direct current connection. Additionally, the battery unit 170 is connected to the traction motor generator 77 of the four axle bogie 72 of the rolling stock tender car 70.

Turning in detail to the signaling system 80, it is shown to contain multiple control modules 85 for processing signal information received. In so doing, when the ATO tender unit 50 is in operation and driving the consist 35, the signaling system 80 is aware of track clearance and right of way issues that may arrive as the train 30 travels along its journey. In addition to the control modules 85 which process the signal data, the signaling system 80 has a connection to a first interface panel 64 which is attached to the side wall of the containment unit 65 housing the ATO system 60. The first interface panel 64 gives a user who is present and working on the ATO tender unit 50 access to the control modules 85 of the signaling system 80. From there, a user can access the signaling system 80 to perform diagnostic checks, retrieve trip data and upload pre-trip information depending on the needs of current or future journeys planned for the ATO tender unit 50. As stated earlier the signaling system 80 receives power from and is connected to the power supply 160 of the ATO system 60. The signaling system 80 is also connected to the wheel sensor 76 of the four axle bogie 72 of the rolling stock tender car 70. Data regarding the revolutions per minute of the wheels 73 from the wheel sensor 76 is transmitted to the signaling system 80 so that the signaling system 80 can compute the speed of the ATO tender unit 50 and use that information to communicate with a remote back office. This communication can include upcoming route and clearance information regarding the ATO tender unit's 50 travel along a track. A balise antenna 175 is also connected to the signaling system 80. The balise antenna 175 may provide the signaling system 80 with the train location as the ATO tender unit 50 travels along the track. This information is also stored and recorded in the signaling system 80 much like the information from the wheel sensor 76, and this information is transmitted to the remote back office for upcoming journey instructions and clearance.

Emergency magnet valves 180 may also be connected to the signaling system 80. The emergency magnet valves 180 may in turn connect to a brake pipe 190. The emergency magnet valves 180 are present so that if the signaling system 80 signals that an emergency braking procedure is needed, the emergency magnet valves 180 can engage or disengage the brake pipe 190 as to apply or release the emergency brake. The connection between the emergency magnet valves 180 and the brake pipe 190 may be a pneumatic connection or the like. Therefore, a connection is present from the brake pipe 190 that leads to the end connections 150 of the ATO tender unit 50 which in turn connects the brake pipe 190 to the first locomotive 55. In this fashion, the brake pipe 190 can be in communication with the rest of the train 30 and may only apply an emergency braking procedure if it is necessary and needed based on the received information regarding braking the entire train 30.

While the ATO tender unit 50 is in operation, heat is produced by the multiple systems and components of the ATO tender unit 50. Therefore, a heating, ventilating, and air conditioning (HVAC) system 195 may be included within the containment unit 65 housing the ATO system 60. The HVAC system 195 includes a ventilation and cooling fan 196 to cool the multiple controllers, processors, and power components housed within the containment unit 65. Additionally, a filtration device 198 is included with the HVAC system 195. The filtration device 198 can be configured to filter out foreign materials that may accumulate within the air of the containment unit 65 that may hinder the hardware operating the ATO system 60. Filtering the air in this way prevents dust and other particles form accumulating on or degrading the hardware of the ATO system 60 so that the ATO tender unit 50 can operate for multiple hours and multiple journeys before a thorough cleaning is needed.

Figure 6:
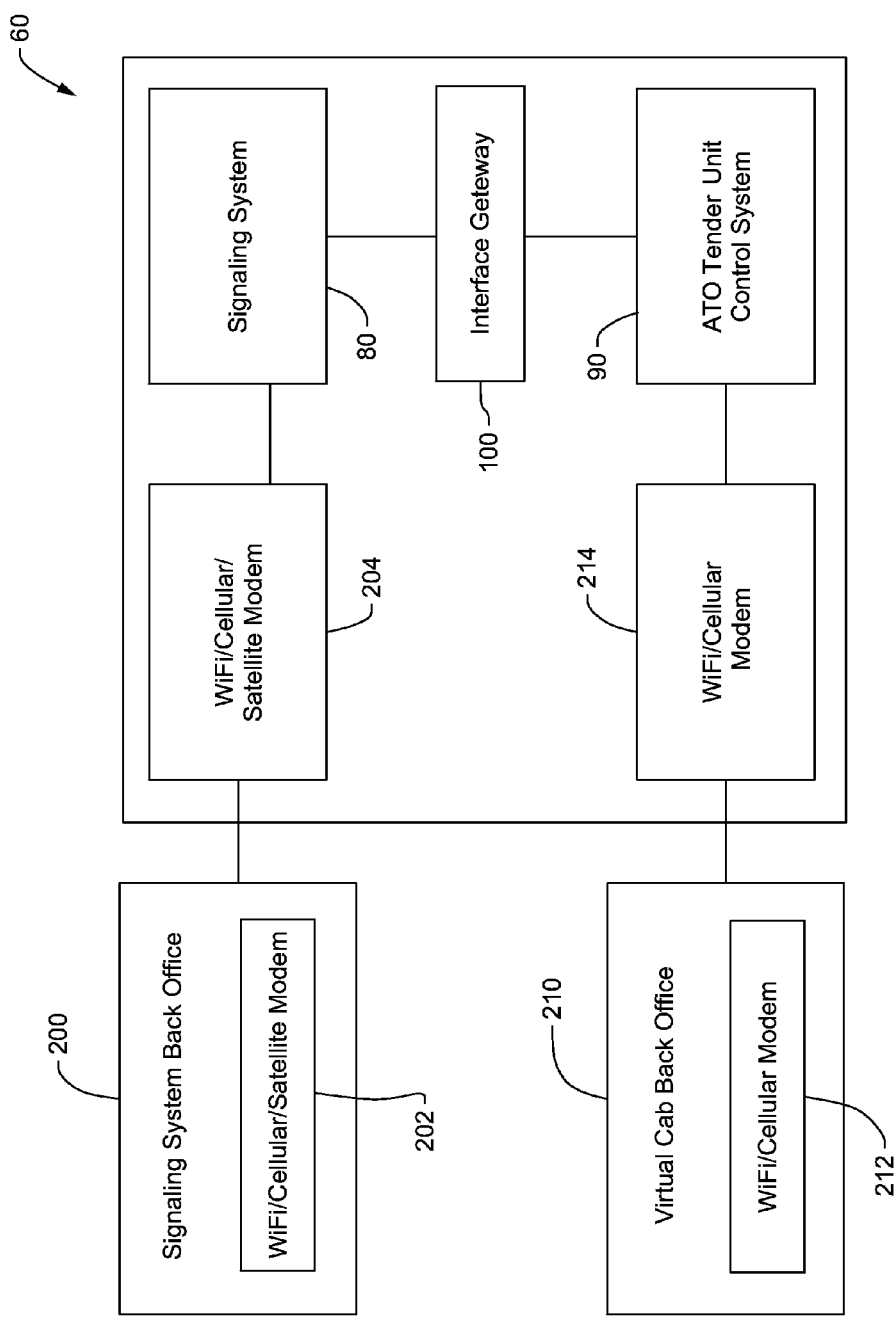
FIG. 6 is a schematic view of the interconnections between the systems of the automatic train operation system and the back offices of the systems of the automatic train operation system in accordance with one embodiment of the present disclosure.

Turning now to FIG. 6, an illustrated example is shown of how the multiple systems of the ATO tender unit 50 communicate with remote office locations. As stated earlier, the ATO tender unit 50 is designed as a standalone unit which can operate large consists 35 without the aid of an on board engineer or conductor. Therefore communication with an outside remote back office may be needed to operate of the ATO tender unit 50. The two most important systems of the ATO system 60, the signaling system 80 and the ATO tender unit control system 90, communicate wirelessly with their respective back offices. The signaling system back office 200 communicates with the signaling system 80 of the ATO system 60 through a wireless Wi-Fi, or cellular, or satellite modem 202. To receive information from the signaling system back office 200, wireless Wi-Fi, or cellular, or satellite modem 204 may be provided within the ATO tender unit 50 and connected to the signaling system 80. Information from the signaling system back office 200 is transmitted through the wireless connection to the signaling system 80 regarding updated track clearances, updated track congestion, and updated authorized speed information. The signaling system 80 transmits this received information to the ATO tender unit control system 90 through the interface gateway 100 so that the ATO tender unit control system 90 knows what track speed and clearance the ATO tender unit 50 driving the train 30 is allowed to maintain. The communication between the signaling system 80 and the signaling system back office 200 occurs continuously as the ATO tender unit 50 is in operation. This provides real time updates from the signaling system back office 200 so that changes to track conditions can immediately be transmitted and the ATO tender unit 50. Information transmitted to the ATO tender unit 50 allows the ATO tender unit 50 to adjust the traveling train 30 accordingly.

Another important remote back office that is in communication with the ATO system 60 is the ATO tender unit back office 210. The ATO tender unit back office 210 communicates with the ATO tender unit control system 90 through a wireless Wi-Fi/cellular modem 212. To receive information from the ATO tender unit back office 210, a wireless Wi-Fi/cellular modem 214 may be provided within the ATO tender unit 50 and connected to ATO tender unit control system 90. Like the signaling system 80, the ATO tender unit control system 90 communicates ATO tender unit functions and overall health of the ATO tender unit 50 to the ATO tender unit back office 210. Based on information received from the ATO tender unit control system 90, or in turn information received from the signaling system 80 that is transmitted through the ATO tender unit control system 90 to the ATO tender unit back office 210, a user in the ATO tender unit back office 210 can issue commands to the ATO tender unit 50 to adjust the operation of the train 30. In an exemplary embodiment of the present disclosure, track clearance may be granted by the signaling system back office 200. This information is relayed to the signaling system 80 of the ATO system 60 and in turn to the ATO tender unit control system 90 of the ATO system 60. The ATO tender unit control system 90 of the ATO system 60 then transmits that information to the ATO tender unit back office 210. From the ATO tender unit back office 210, a user inputs a command to move the ATO tender unit 50 to a desired location based on the track clearance information received. The location command is then transmitted back to the ATO tender unit control system 90 by way of the Wi-Fi or cellular modem 212 and 214. When the ATO tender unit control system 90 receives the location command, the ATO tender unit control system 90 runs the necessary driving algorithms to move the entire train 30 to the desired location. In this scenario, the entire operation of the ATO tender unit 50 and in turn the entire train 30 is executed remotely from a user in the ATO tender unit back office 210. Additionally, the ATO tender unit control system 90 can transmit information regarding the health of the ATO tender unit 50 or any one of the locomotives of the consist 35 connected to the ATO tender unit 50. In another exemplary embodiment of the present disclosure, a mechanical failure may occurred in one of the locomotives of the consist 35. In detecting this mechanical failure, a warning signal from the malfunctioning locomotive will be transmitted to the ATO tender unit control system 90 through the end connections 150 of the ATO system 60. That warning signal will then be transmitted to the ATO tender unit back office 210 for a user in the ATO tender unit back office 210 to evaluate the severity of the malfunctioning locomotive. If a power down procedure or a reduced speed operation is needed, the user in the ATO tender unit back office 210 will input a command to power down the ATO tender unit 50 and in turn the malfunctioning locomotive of the consist 35. The power down command will transmit from the ATO tender unit back office 210 via the Wi-Fi/cellular modem 212 and 214 to the ATO tender unit control system 90. The ATO tender unit control system 90 will then execute the power down algorithm to gentle stop the ATO tender unit 50, and the consist 35 connected to the ATO tender unit. This power down procedure will effectively stop the train 30 until the problem with the malfunctioning locomotive can be resolved.

Figure 7:
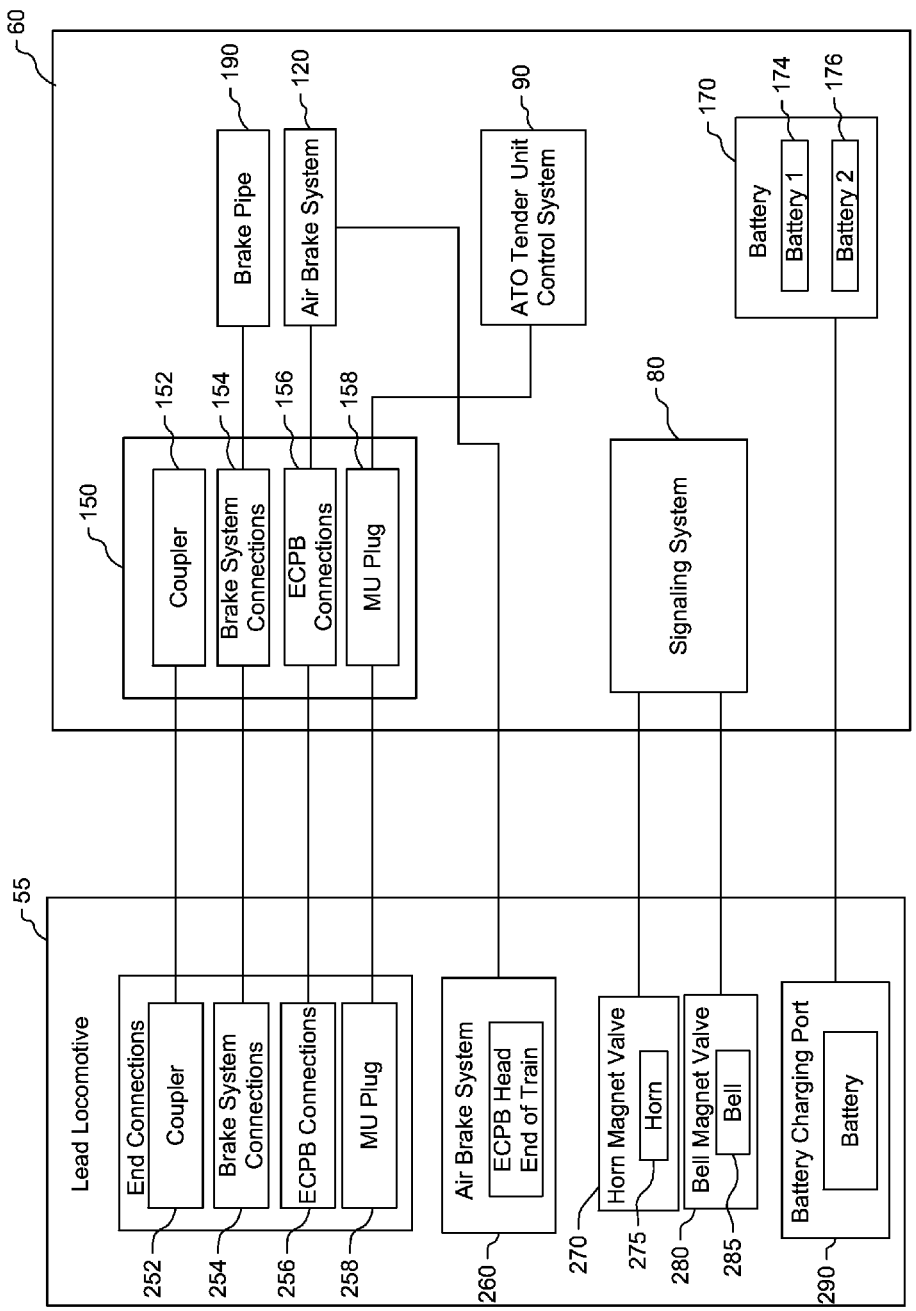
FIG. 7 is a schematic view of the interconnections between the automatic train operation system and a first locomotive in accordance with one embodiment of the present disclosure.

FIG. 7 illustrates the end connections 150 between the first locomotive 55 of the consist 35 and the ATO system 60 of the ATO tender unit 50. Another of the important features of the ATO tender unit 50 shown in FIG. 7 is the ability of the ATO tender unit 50 to connect to multiple different locomotives manufactured by different companies. In this respect, the ATO tender unit 50 can be with varied locomotives that may be provided by the railroad to form the consist 35. Having this versatility allows the ATO tender unit 50 to be used with any locomotive in any track environment and allow for remote operation of the first locomotive 55 through the ATO tender unit 50. ATO system 60 of the ATO tender unit 50 has multiple end connections 150. These end connections 150 connect to the first locomotive 55 of the consist 35. As stated above, any locomotive can be connected to the ATO tender unit 50 as the ATO tender unit 50 has been developed to communicate through existing technology to differently manufactured locomotives or outdated older generation locomotives. A coupler 152 of the end communications 150 of the ATO system 60 attaches to a first locomotive coupler 252 of the first locomotive end connections 250. This connection may be the physical connection holding the ATO tender unit 50 to the first locomotive 55. The first locomotive brake system connections 254 attach to the brake system connections 154 of the end connections 150 of the ATO system 60. The brake system connections 154 of the ATO system 60 further connect to the brake pipe 190 of the ATO tender unit 50 which is in communication with the signaling system 80. Therefore, if a braking command is needed, the brake system connections 154 of the ATO system 60 is in communication with the first locomotive brake system connections 254 so that all the connected locomotives of the consist 35 as well as the ATO tender unit 50 brake in unison as to not cause a derailment or other malfunction of the train 30. Additionally, the first locomotive electronically controlled pneumatic braking (ECPB) connections 256 connect to the ECPB connections 156 of the ATO tender unit 50. The ECPB connections 156 and first locomotive ECPB connections 256 provide train line communication for the ECPB system. One component of the mentioned other equipment is the air brake software 120 of the ATO tender unit 50. The air brake software 120 is interfaced to the ECPB connections 156 of the ATO system 60 and in turn to the first locomotive ECPB connections 256 to control the air brakes of the entire train 30. Furthermore, the air brake software 120 interfaces with the brakes 74 of the four axle bogie 72. The air brake software 120 may also interface with the air brake system 260 in the first locomotive 55 and all other attached locomotives through the ECPB connections 156 and the first locomotive ECPB connections 256.

Another major end connection 150 of the ATO system 60 is the multiple unit (MU) plug 158 and first locomotive MU plug 258. The MU plug 158 and first locomotive MU plug 258 provide a connection to simultaneously control all the traction equipment of the consist 35 from a single location. In an embodiment of the present invention, that single location is the ATO tender unit 50. The MU plug 158 of the ATO system 60 connects to the first locomotive MU plug 258. This connection allows the ATO tender unit 50 to effectively drive and operate the entire consist 35. Through this connection to the first locomotive 55 the ATO tender unit 50 can authorized drive and stop commands to be executed and distributed through the consist 35 connected through the MU plug 158 and first locomotive MU plug 258. The MU plug 158 of the ATO tender unit 50 is connected to the ATO tender unit control system 90. Commands received by the ATO tender unit control system 90 are then transmitted through the MU plug 158 and the first locomotive MU plug 258 to the first locomotive 55 and distributed from there to the remaining consist 35.

The signaling system 80 of the ATO tender unit 50 also connects to the first locomotive 55. The signaling system 80 connects to the horn magnet valve 270 of the first locomotive 55 to sound the horn 275 when commands are executed through the ATO system 60. Additionally, the signaling system 80 is connected to the bell magnet valve 280 of the first locomotive 55. Commands to ring the bell 285 of the first locomotive 55 are received by the signaling system 80 of the ATO tender unit 50 and transmitted to the bell magnet valve 280 of the first locomotive 55. Ringing the bell 285 or sounding the horn 275 of the first locomotive 55 may be necessary in high traffic areas or at predetermined rail crossings as the train 30 operated by the ATO tender unit 50 travels along its journey.

A battery charging port 290 may be also connected between the first locomotive 55 and the battery unit 170 of the ATO tender unit 50. The battery charging port 290 pulls power from the first locomotive 55 to continuously charge the batteries 174 and 176 of the ATO tender unit 50 when the ATO tender unit 50 is in command of the train 30. By charging the battery unit 170 of the ATO tender unit 50, the battery unit 170 of the ATO tender unit 50 will not drain. Having full battery power allows for the ATO tender unit 50 to operate independently of the first locomotive 55 when it is detached and moved into a different position to perform a new function such as attaching to a different first locomotive to drive a different train.

Figure 8:
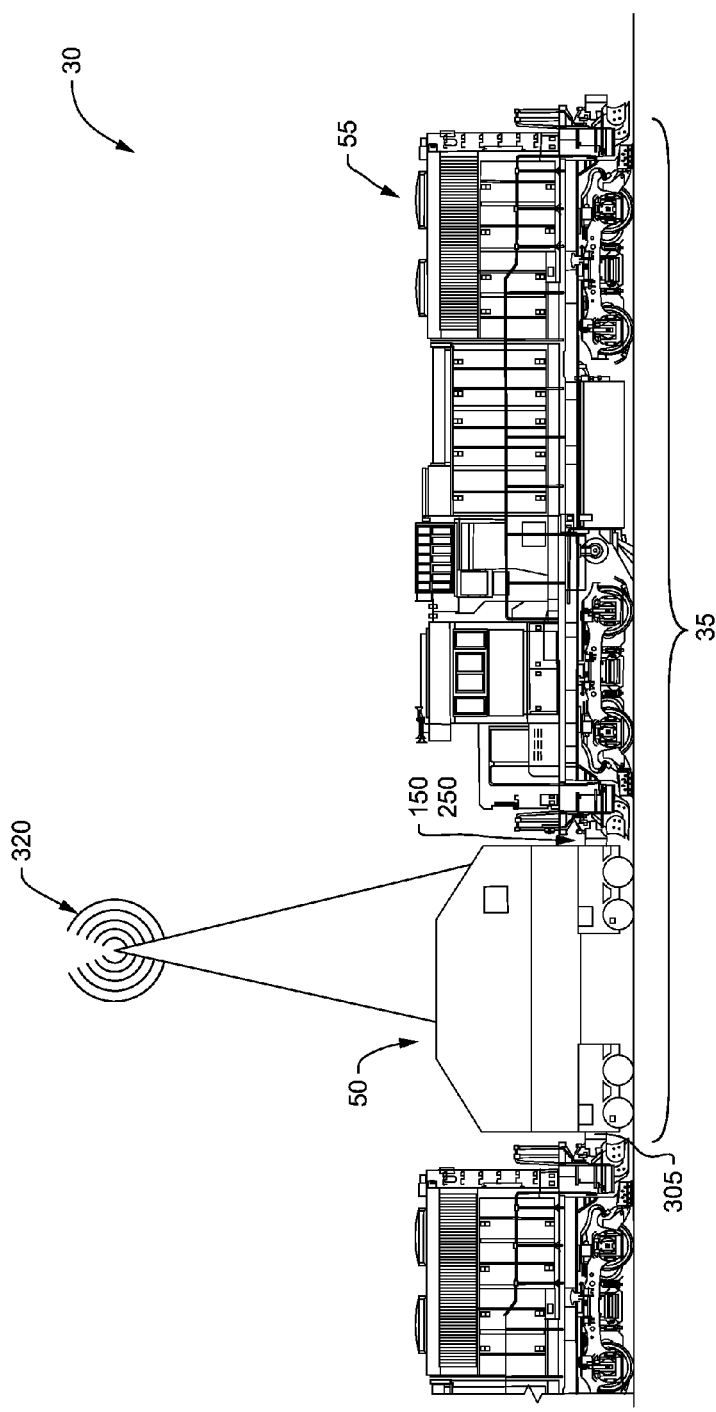
FIG. 8 is a view of a train, having the automatic train operation tender unit, in operation along a route in accordance with one embodiment of the present disclosure.

FIG. 8 illustrates the ATO tender unit 50 in operation behind a first locomotive 55. The ATO tender unit 50 along with the first locomotive 55 are part of a consist 35 placed on the route 16. The ATO tender unit 50 is placed behind the first locomotive 55. Through the end connections 150 and first locomotive end connections 250 described above, the ATO tender unit 50 is attached to the first locomotive 55. Additionally, through a physical coupling 305 at the other end of the ATO tender unit 50, the ATO tender unit 50 is attached to a trailing locomotive of the consist 35. As the ATO tender unit 50 moves along the route 16 with the entire train 30, radio towers 320 transmit signals which can keep the ATO tender unit 50 in communication with the offsite back offices, such as the signaling system back office 200 or the ATO tender unit back office 210, which are necessary for proper operation of the ATO tender unit 50. As the ATO tender unit 50 receives and transmits signal information through the radio towers 320, a user at a remote back office location can input commands to be performed by the ATO tender unit 50. Having a setup such as this allows the ATO tender unit 50 to function automatically and remote from the user in charge of train operation located at the remote back office.

In an exemplary embodiment of the present disclosure, automatic operation of a train 30 begins with personnel configuring the composition of the train 30. Usually the personnel will attach a first locomotive 55 at the front of the train 30. Following the first locomotive 55 the personnel with attach the ATO tender unit 50 to the train 30. The ATO tender unit 50 and the first locomotive 55 are attached together via the above described end connections 150 and first locomotive end connections 250. After the ATO tender unit 50 is attached to the train 30 the remaining locomotives of the consist 35 and railcars 14 will be attached. Personnel will then interact with at least one interface 64 or 66 located on the side of the containment unit 65 of the ATO tender unit 50 preforming and evaluating pre-trip diagnostics. After the personnel has cleared the ATO tender unit 50 for operation, the ATO tender unit back office 210 will evaluate the onboard health of the ATO tender unit 50 by communicating with the ATO tender unit 50. Once the onboard health check is completed by the ATO tender unit back office 210, the ATO tender unit control system 90 will perform its own readiness check to evaluate the ATO tenders unit's ability to drive. If all the readiness checks come back compliant, the signaling system back office 200 will send a movement authorization command to the ATO tender unit 50. This authorized movement signal will be received by the signaling system 80 of the ATO tender unit 50 and the authorized movement signal will be sent to the ATO tender unit control system 90 through the interface gateway 100. The ATO tender unit control system 90 will then execute a driving strategy algorithm and utilize the energy management system 110 of the ATO tender unit 50. Next, the ATO tender unit control system 90 will issue a driving command based on the authorized movement signal. The driving command will be sent locally through the end connections 150 and first locomotive end connections 250 to the first locomotive 55. Additionally, the driving command can be sent wirelessly to a remote consist locomotive 140 connected to the ATO tender unit control system 90 by the distributed power system 130. Likewise, if a braking command is needed it will be sent to the brake system. The brake system commands 96 of the ATO tender unit control system 90 are sent to the remaining locomotives of the consist 35 and trailing consists via distributed power 130. Additionally, the ATO tender unit control system 90 may send out throttle and database commands 94 through the MU plug 158 and the first locomotive MU plug 258 to the first locomotive 55 and all other locomotives of the consist 35 and railcars 14 connected to the MU system. Throughout operation, the ATO tender unit control system 90 will continuously monitor the health of the ATO tender unit 50 and communicate that information back to the ATO tender unit back office 210.

It will be appreciated that in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come with the scope of the following claims and equivalents thereof.

INDUSTRIAL APPLICABILITY

From the foregoing, it may be appreciated that the ATO tender unit disclosed herein may have industrial applicability in a variety of setting such as, but not limited to, use in the rail industry. Such a ATO tender unit may also be used to control automobiles, trucks, locomotive and rail equipment, tractors, earth moving machines, mining equipment, or construction machines or the like that may be placed on a track within a work environment.

Figure 9:
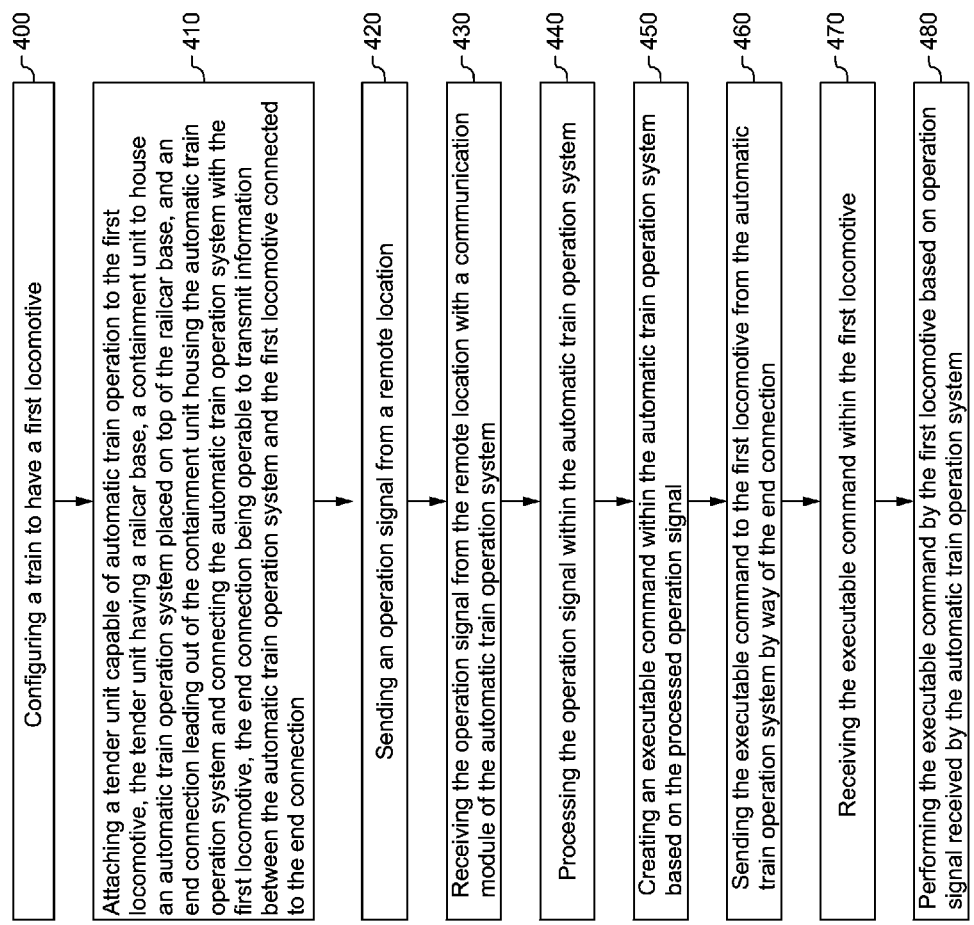
FIG. 9 is a flowchart that exemplifies one method of automatically operating a train with use of the automatic train operation tender unit in accordance with one embodiment of the present disclosure.

As viewed in FIG. 9, a flow chart is viewed showing a method of automatically operating a train 30 with use of the ATO tender unit. First, in block 400, a train 30 is configured to have a first locomotive 55. Next, in block 410, a tender unit 50 capable of automatic train operation is attached to the first locomotive. The tender unit 50 has a railcar base and a containment unit 65 to house an automatic train operation system 60 placed on top of the railcar base. Through end connections 150 leading out of the containment unit 65 housing the automatic train operation system 60, the automatic train operation system 60 is connected to the first locomotive end connections 250. The end connections 150 and first locomotive end connections 250 are operable to transmit an operation signal between the automatic train operation system 60 and the first locomotive 55. Next, in block 420, an operation signal 145 is sent from a remote location. In this embodiment of the disclosure the remote location may be the ATO tender unit back office 210 which can send the operation signal 145. Then, in block 430, the operation signal 145 from the remote location is received by a communication module of the automatic train operation system 60. The may be the Wi-Fi/cellular modem 214 which connects the ATO tender unit back office 210 to the ATO tender unit control system 90. In block 440, the operation signal 145 is processed within the automatic train operation system 60. The operation signal 145 can be processed by many of the systems of the automatic train operation system 60. However, since the ATO tender unit control system 90 is the main control system 92 of the ATO tender unit 50, this is where the majority of processing within the ATO tender unit 50 takes place. Then in block 450, an executable command 148 is produced from the automatic train operation system 60 based on the operation signal 145. If the operation signal 145 is processed in the ATO tender unit control system 90, the ATO tender unit control system 90 may run driving algorithms to produce throttle and database commands 94 to send to the first locomotive 55. In block 460, the executable command 148 is sent from the automatic train operation system 60 to the first locomotive 55 through the end connections 150 and first locomotive end connections 250. Next in block 470, the first locomotive 55 receives the executable command 148 from the automatic train operation system 60. Finally in block 480, the first locomotive 55 preforms the executable command 148 that was created based on the operation signal 145 received by the automatic train operation system 60. In a visual example of this final set, the first locomotive 55 may increase the throttle of the first locomotive 55 in response to the operation signal 145 telling the ATO tender unit 50 to speed up.

Additionally in the rail industry, such a ATO tender unit allows increased efficiency and operation regarding the transport of good or passengers along the railways. The ATO tender unit automates the driving process of long journeys so that fewer if any railway personnel need to be present on the trains operated by the ATO tender unit. Additionally, the ATO tender unit can communicate with any existing locomotive. Since the ATO tender unit communicates through the existing communication networks employed by the rail industry, the ATO tender unit can attach to any locomotive made to American Association of Railroads (AAR) standards. Furthermore, the ATO tender unit can interface with older generation locomotives or railcars adding to the efficiency and streamline of railway travel. The ATO tender unit presents a significant advantage to railway operations to keep costs down and work place hazards and employee travel at a minimum while providing railway operators excellent control and management of their existing rail fleets.

While the foregoing detailed description has addressed only specific embodiments, it is to be understood that the scope of the disclosure is not intended to be limiting. Thus, the breadth and spirit of this disclosure is intended to be broader than any of the embodiments specifically disclosed and/or encompassed within the claims appended hereto.

What is claimed is:

1. A tender unit for automatic operation of a train, the tender unit comprising:
    a railcar base;
    a containment unit to house an automatic train operation system placed on top of the railcar base; and
    an end connection leading out of the containment unit housing the automatic train operation system and connecting the automatic train operation system to a second rail vehicle, the end connection being operable to transmit an operation signal between the automatic train operation system and the second rail vehicle connected to the end connection, the operation signal being completed by the second rail vehicle based on a executable command contained within the operation signal.

2. The tender unit of claim 1, wherein the automatic train operation system communicates wirelessly with a remote office.

3. The tender unit of claim 2, wherein the remote office issues the operation signal to be sent by the automatic train operation system to the second rail vehicle.

4. The tender unit of claim 1, wherein the tender unit and the second rail vehicle are manufactured or produced by a different entity.

5. The tender unit of claim 1, wherein the automatic train operation system contains an automatic train operation tender unit control system, a signaling system, an energy management system and an interface gateway to connect communication between the automatic train operation tender unit control system, the signaling system and the energy management system.

6. The tender unit of claim 5, wherein the automatic train operation tender unit control system contains a stored driving strategy algorithm, a stored database of throttle commands, and a stored database of braking commands.

7. The tender unit of claim 5, wherein the automatic train operation tender unit control system processes a stored driving strategy algorithm and calculates the executable command of the operation signal to be transmitted to the second rail vehicle.

8. The tender unit of claim 5, wherein the automatic train operation tender unit control system issues a second operation signal to a distributed power system of the automatic train operation system, the distributed power system wirelessly communicates the second operation signal to a remote third rail vehicle, the second operation signal being completed by the third rail vehicle based a second executable command contained within the second operation signal.

9. The tender unit of claim 5, wherein the end connection contains a coupler connection, a brake system connection, an electronically controlled pneumatic brake connection, and a multiple unit plug connection.

10. The tender unit of claim 9, wherein the automatic train operation tender unit control system sends the operation signal to the multiple unit plug connection and communicates the operation signal through the multiple unit plug connection to the second rail vehicle.

11. A train being automatically controlled by an attached tender unit, the train comprising:
    a plurality of rail vehicles positioned along a track and attached to one another;
    a first locomotive being the one of the plurality of rail vehicles;
    a tender unit being another of the plurality of rail vehicles and placed adjacent to the first locomotive;
    a railcar base of the tender unit attached to the first locomotive by a coupling connection;
    a containment unit to house an automatic train operation system placed on top of the railcar base of the tender unit; and
    an end communication connection connecting the automatic train operation system with the first locomotive, the end communication connection being operable to transmit an operation signal between the automatic train operation system and the first locomotive connected to the end connection, the operation signal being completed by the first locomotive based on an executable command contained within the operation signal.

12. The train of claim 11, wherein the automatic train operation system of the tender unit communicates wirelessly with a remote office.

13. The train of claim 12, wherein the remote office issues the operation signal to be sent by the automatic train operation system to the first locomotive.

14. The train of claim 11, wherein the tender unit and the first locomotive are manufactured or produced by a different entity.

15. The train of claim 11, wherein the automatic train operation system contains an automatic train operation tender unit control system, a signaling system, an energy management system and an interface gateway to connect communication between the automatic train operation tender unit control system, the signaling system and the energy management system.

16. The train of claim 15, wherein the automatic train operation tender unit control system processes a stored driving strategy algorithm and calculates the executable command of the operation signal to be transmitted to the first locomotive.

17. The train of claim 15, wherein the automatic train operation tender unit control system issues a second operation signal to a distributed power system of the automatic train operation system, the distributed power system wirelessly communicates the second operation signal to a remote trailing locomotive, the second operation signal being completed by the remote trailing locomotive based on a second executable command contained within the second operation signal.

18. The train of claim 15, wherein the end communication connection contains a brake system connection, an electronically controlled pneumatic brake connection, and a multiple unit plug connection.

19. The train of claim 18, wherein the automatic train operation tender unit control system sends the operation signal to the multiple unit plug connection and communicates the operation signal through the multiple unit plug connection to the first locomotive.

20. A method to automatically operate a train, the method comprising:
    configuring a train to have a first locomotive;
    attaching a tender unit capable of automatic train operation to the first locomotive, the tender unit having a railcar base, a containment unit to house an automatic train operation system placed on top of the railcar base, and an end connection leading out of the containment unit housing the automatic train operation system and connecting the automatic train operation system with the first locomotive, the end connection being operable to transmit information between the automatic train operation system and the first locomotive connected to the end connection;

sending an operation signal from a remote location;

receiving the operation signal from the remote location with a communication module of the automatic train operation system;

processing the operation signal within the automatic train operation system;

creating an executable command within the automatic train operation system based on the processed operation signal;

sending the executable command to the first locomotive from the automatic train operation system by way of the end connection;

receiving the executable command within the first locomotive; and performing the executable command by the first locomotive based on operation signal received by the automatic train operation system.

* * * * *